(12) United States Patent
Brisbart et al.

(10) Patent No.: US 7,788,284 B2
(45) Date of Patent: Aug. 31, 2010

(54) SYSTEM AND METHOD FOR KNOWLEDGE BASED SEARCH SYSTEM

(75) Inventors: Franck Brisbart, Grenoble (FR);
Matthieu Gaillard, Moirans (FR);
Gilles Vandelle, Montbonnot (FR)

(73) Assignee: Yahoo! Inc., Sunnyvale, CA (US)

( * ) Notice: Subject to any disclaimer, the term of this patent is extended or adjusted under 35 U.S.C. 154(b) by 288 days.

(21) Appl. No.: 11/768,273

(22) Filed: Jun. 26, 2007

(65) Prior Publication Data

US 2009/0006354 A1    Jan. 1, 2009

(51) Int. Cl.
*G06F 17/00* (2006.01)
(52) U.S. Cl. .................................. 707/798; 707/728
(58) Field of Classification Search .............. 707/5, 707/3, 100, 731, 728, 749, 798; 705/3
See application file for complete search history.

(56) References Cited

U.S. PATENT DOCUMENTS

| | | | |
|---|---|---|---|
| 6,321,220 B1* | 11/2001 | Dean et al. ....................... 1/1 |
| 6,442,545 B1* | 8/2002 | Feldman et al. ................. 707/6 |
| 6,691,108 B2* | 2/2004 | Li ....................................... 1/1 |
| 6,711,585 B1* | 3/2004 | Copperman et al. ................ 1/1 |
| 6,876,997 B1* | 4/2005 | Rorex et al. ..................... 707/3 |
| 2005/0246321 A1* | 11/2005 | Mahadevan et al. ............ 707/3 |
| 2007/0016545 A1* | 1/2007 | Broder et al. ................... 707/1 |
| 2007/0282632 A1* | 12/2007 | Sachs .............................. 705/3 |
| 2008/0243811 A1* | 10/2008 | He et al. ......................... 707/5 |
| 2009/0006354 A1* | 1/2009 | Brisbart et al. ................. 707/5 |

* cited by examiner

*Primary Examiner*—Tony Mahmoudi
*Assistant Examiner*—MD. I Uddin
(74) *Attorney, Agent, or Firm*—Ostrow Kaufman & Frankl LLP

(57) ABSTRACT

The present invention provides functionality for conducting a knowledge based by finding search results from limited topic domains. According to one embodiment, the method of the present invention includes retrieving the context of a given user and identifying a plurality of characteristics associated with the user's context. The one or more characteristics associated with the user's context are displayed to the user and the user may select from the displayed characteristics. One or more items of content are retrieved based upon the user's selection and presented to the user on the user's client device.

6 Claims, 5 Drawing Sheets

SYSTEM AND METHOD FOR KNOWLEDGE BASED SEARCH SYSTEM

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates to methods for providing a knowledge based search. More specifically, the present invention is directed to facilitating a search that returns more relevant results to a search query based on user profiles and prior searches.

BACKGROUND OF THE INVENTION

The goal of search is to find the most relevant information. Popular search engines such as Yahoo!, Google, and MSN, have relied on traditional horizontal approach to searching. Horizontal search engines are usually characterized by a lack of a hierarchal structure. Horizontal search engines rely on search crawlers that typically index almost everything over the internet or a network. The results they produce span a very broad range of categories. However, users frequently desire search results from a narrower range of categories.

Since search queries tend to be short, one technique would require the search query to be more complex. Some search systems allow users to input complex logic queries in order to get better results. This approach is undesirable because the required search format in such systems is no longer intuitive. Some users would therefore not take the time to learn to use a system and avoid it altogether. Also it takes more time and effort for one familiar with the particular search format to craft a proper search statement. There are other search engines that give more relevant results to a particular topic, but this is because the search engine indexes and works for one domain. Hence, there is a need for a robust, practical approach to narrow search results to user desired topic domains while allowing search queries to remain simple and brief.

SUMMARY OF THE INVENTION

The present invention is directed towards a system and method for relevant search results and information to a user based on their search query. The present invention provides a user with the ability to receive search results based on a narrow range of topics. The present invention also provides a method for generating a keyword graph based on a direct acyclic model that forms the basis for the present invention.

According one embodiment of the invention, a user enters a search query. First, a traditional horizontal search occurs. A certain number of the most relevant results are captured. The documents from these relevant results are analyzed. From these documents, key related terms and attributes related to these terms are extracted. These related terms are used in conjunction with a keyword graph. This keyword graph comprises of nodes, or terms connected to on another. These nodes consist of both terms and attributes also. The related terms extracted are then mapped onto the keyword graph. In this process, the keyword graph connections are assigned energy weights based how the prisma terms map onto the keyword graph. According to one embodiment, prisma terms are derived through the use of systems and methods described more fully in U.S. Pat. No. 6,947,930, entitled "SYSTEM AND METHOD FOR INTERACTIVE SEARCH QUERY REFINEMENT," which was filed on Apr. 25, 2003, the disclosure of which is hereby incorporated by reference in its entirety. The keyword graph with the weighted connections can then be traversed to determine "main nodes." From these main nodes the most relevant topics to the search can be determined. In one embodiment the search results related to these main topics may be returned.

Another embodiment of the invention discloses a method for generating a keyword graph based on a direct acyclic graph model. First keyword graph is generated from a large pool of keyword terms. The terms are connected based on their relevance to each other. After the graph is generated, a process is disclosed for resolving, or removing cycles. The result is a graph arranged in energy levels in which energy is driven from specific to more generic terms. This keyword graph may then be used with prior disclosed invention in determining relevant topics in response to a user's search input.

BRIEF DESCRIPTION OF THE DRAWINGS

The invention is illustrated in the figures of the accompanying drawings, which are meant to be exemplary and not limiting, in which like references are intended to refer to like or corresponding parts, and in which.

DETAILED DESCRIPTION OF THE INVENTION

In the following description of embodiments of the invention, reference is made to the accompanying drawings that form a part hereof and in which is shown by way of illustration a number of specific embodiments in which the invention may be practiced. It is to be understood that other embodiments may be utilized and structural changes may be made without departing from the scope of the present invention.

Figure 1:
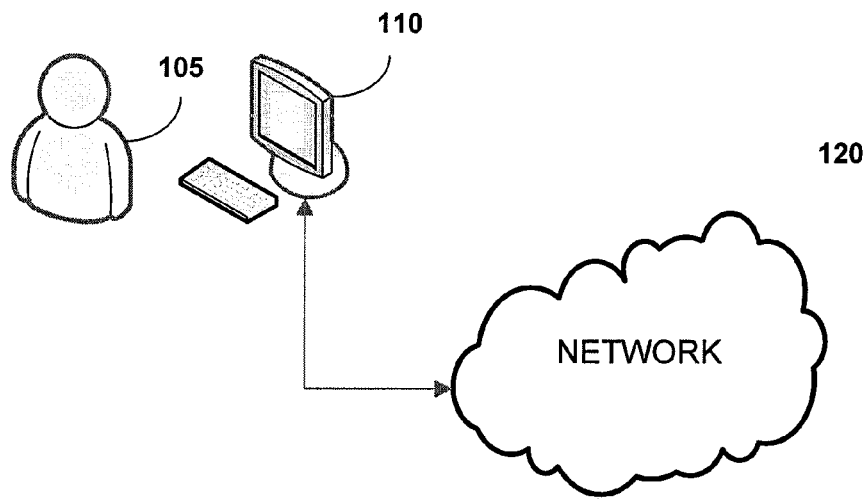
FIG. 1 is a block diagram illustrating a system for conducting a search of a query according to one embodiment of the present invention.
Figure 1:
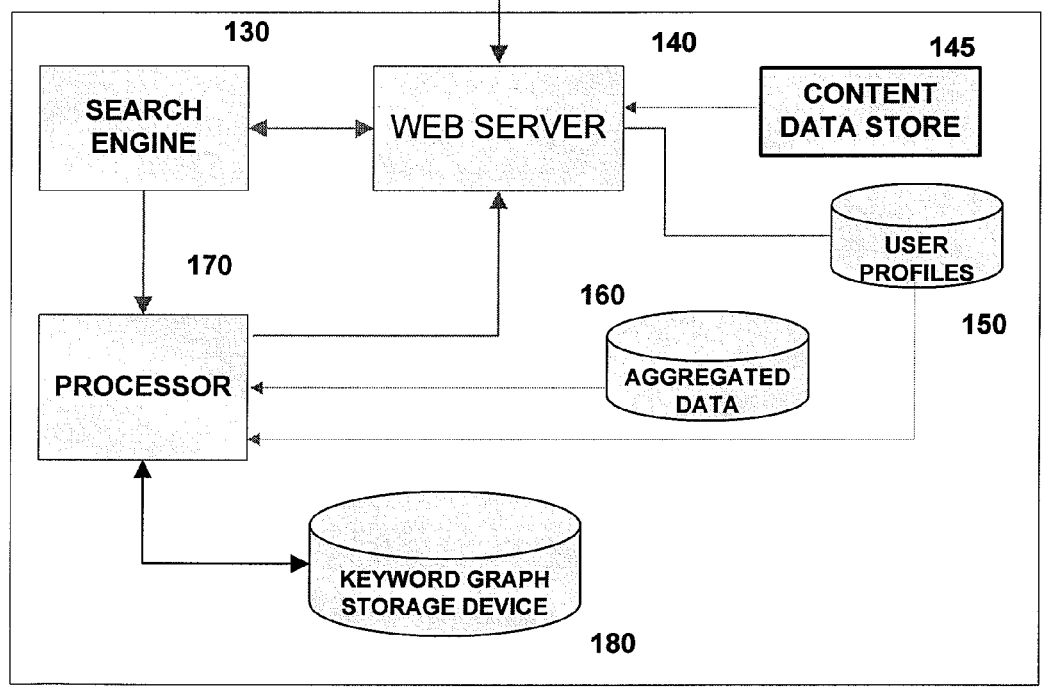

FIG. 1 presents a block diagram illustrating an embodiment of a system 100 for an end user 105 conducting a knowledge based search by entering input into a computer system 110 connected to a web server 140 through a communications network 120. In other embodiments, other devices that may be used besides a computer include but are not limited to personal digital assistants (PDAs), cellphones, and client devices that connect to suitable output devices, such as a television or monitor. According to an embodiment of FIG. 1, a web server 140 may use a content data store 145 to provide content upon request such as web pages, audio, video, other media, or some combination to an end user's computer. For example, the web server may serve a web page with an interactive search box, and a flash file.

The system may also includes other components that facilitate the delivery of search results to a given user query, such as a Search Engine, 130, a Processor 170, and a Keyword Graph Storage Device 180. These components, or a subset of them, may be associated with a particular content provider, or alternatively, the various components may be associated with different content providers. For instance, the search engine 130 may be from one particular website or content provider, whereas the Content Data Store 145, Processor 170 may be associated with another. The web server 140 may receive a search request from a computer system 110 and direct this request to a search engine 130.

According to an embodiment of this invention, a user's search results may be sent to a processor 170. The processor 170 is capable of analyzing the documents of the search results. The processor 170 may access a keyword graph storage device 180. According to an embodiment of the present invention, the processor 170 may filter the search results it receives and send the filtered results to the web server 140 and ultimately to the end user 105.

The keyword graph storage device 180 is a database that maintains records of keyword data and associated attributes. The database holds data about the relationship and connections between the keywords.

Figure 2:
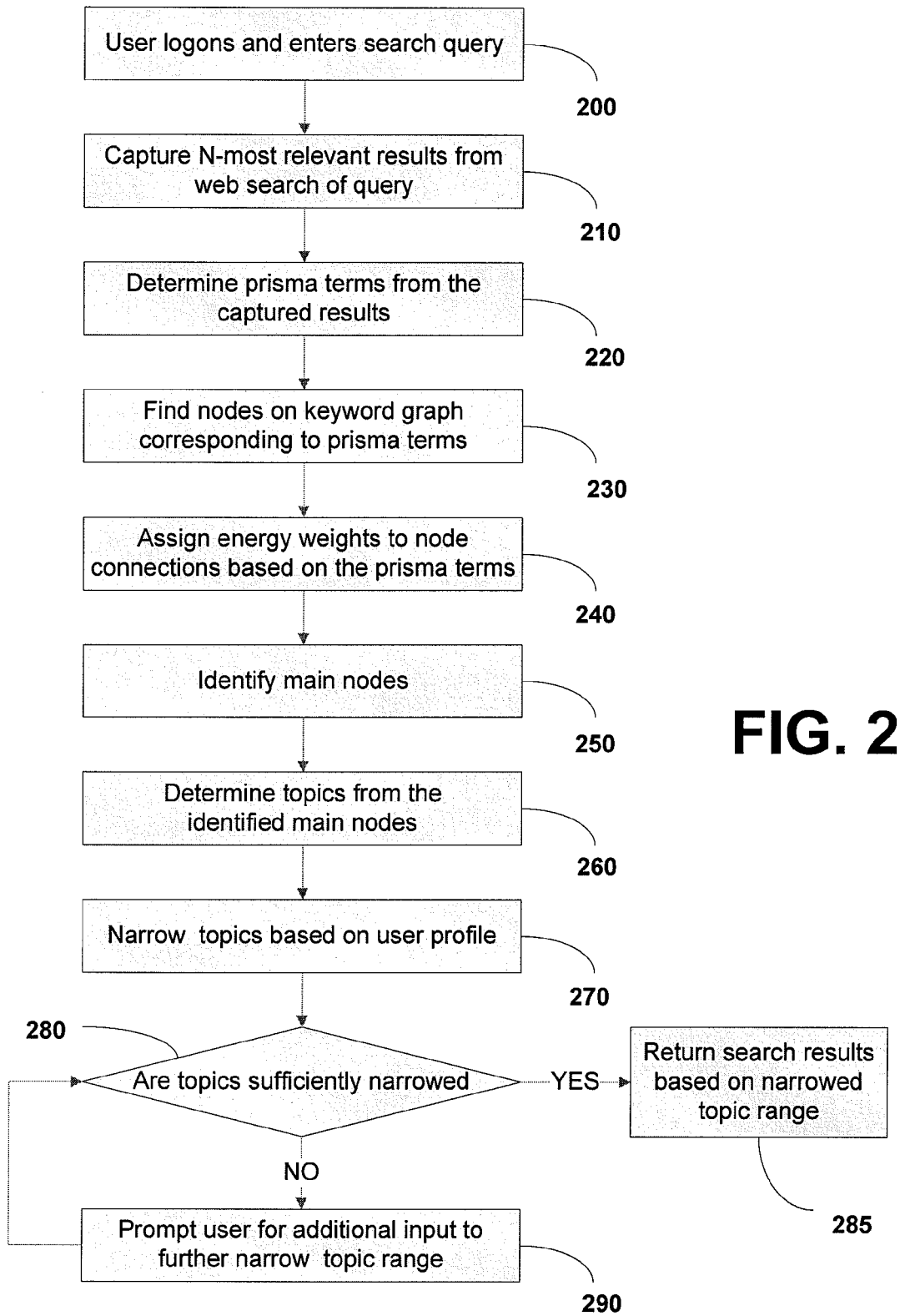
FIG. 2 is a flow diagram illustrating a method for producing search results in response to a user query according to one embodiment of the present invention.

FIG. 2 is a flow diagram illustrating one embodiment of a method for providing a knowledge based search. According to the embodiment, a user enters a search query after logging on 200. For instance the users enter a search query after navigating to a search website. In response to the search request, a standard horizontal web search may be performed with the unspecified number, N, documents or results captured, 210. This search request may be received by the content provider's web server, which may use an internal search engine or in other instances forward the query to another proprietary search engine.

After the N-most relevant results are captured, the prisma terms from these documents are determined 220. The prisma terms are the most relevant terms to a document. A prisma term may be one or multiple words and also include corresponding attributes. For instance, a person's name may be prisma term, and it may be accompanied with a symbol such as 'p' that indicates "person" is a corresponding attribute. According to different embodiments, the number of the prisma terms to be found per document may be a fixed number, variable, or be required meet or not exceed either a minimum or maximum respectively. The prisma terms can be determined by some computer device and kept on some storage device for further use.

Next, a keyword graph is traversed. Nodes corresponding to the prisma terms are found 220. These nodes are assigned energy weights, 230. A keyword graph is a graph or a data structure consisting of terms pointing to other terms. Similar to the prisma terms, a node of a keyword graph may consist of the term and its corresponding attributes. The graph can be generated from a large data source of keywords such as query logs, Wikipedia, dictionaries, etc. The keyword graph data structure may be stored in a database and updated as the source and relationship between terms evolves. Energy weights are assigned based on how the prisma terms relate to one another on the keyword graph. A single energy weight is normalized to the sum of all energy connections on the graph.

Figure 3:
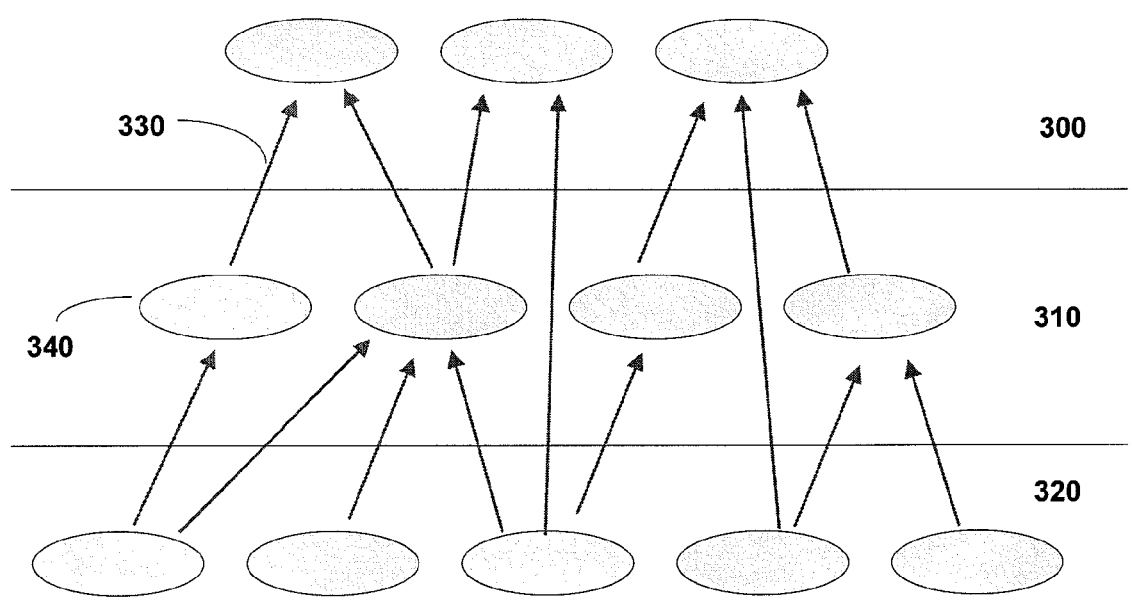
FIG. 3 illustrates a graphical representation of a keyword graph according to one embodiment of the present invention.

In one embodiment, a directed acyclic graph, or a graph with no cycles may be used. FIG. 3 shows an example of a directed acyclic graph, with nodes 320, and connections 310. The nodes of the graph are in separate energy levels and energy "flows" in one direction and never lead back to themselves. The nodes at the top energy level, 300, are where all the energy flows to and hence represent the most common and generic topics. The nodes at lowest energy level, 320, represent the most topic specific terms. The main nodes may typically be located somewhere lower such at the middle level, 310, or lowest level, 320.

Once the energy weights are assigned, the main nodes of the graph are identified 250. Different algorithms may identify the main nodes, but generally the nodes which supply most energy are the main ones. After the main nodes are identified, the topics associated with those main nodes are identified, 260. Though the number of topics from the main nodes may be smaller subset than the topics from the search results of a horizontal search, the topic range may still be refined more. A judgment may be made if the topic range is sufficiently narrowed 280. If the results are sufficiently narrowed, the results may be returned, 285. If the results are be too broad the user may be prompted for additional input, 290. Or in another embodiment the user may be enter more input if the search results are unsatisfactory. When the user topic span has been satisfactorily narrowed, the results may be returned, 290.

Figure 4:
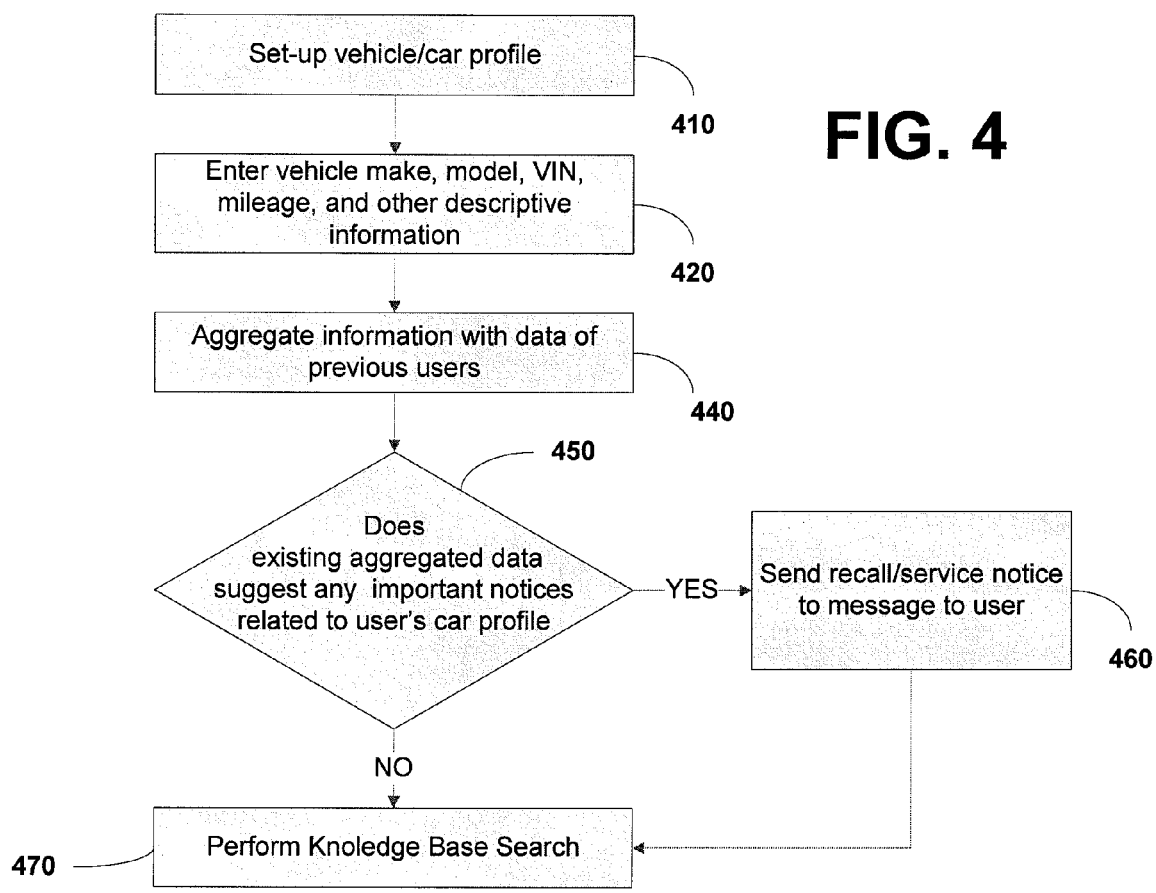
FIG. 4 is a flow diagram illustrating generating a keyword graph according to one embodiment of the present invention.

FIG. 4 shows an embodiment of the present invention illustrating a method used in generating a keyword graph. The first step requires a large pool of keyword terms to be located, 410. For example, this may be some database that has a comprehensive source of terms. Such sources may be a dictionary, wikipedia, or user search query logs. After a suitable source has been located, a unique pair of terms, designated A and B, are retrieved from the keyword pool, 420. If and when this step is repeated, A and B may be retrieved again, but they may not be retrieved together as a pair again. For instance, A may be retrieved again, with some other term, X.

After retrieving a unique A and B, the cross reference matrices, designated Xref(A, B) and Xref(B, A) are calculated, 425. Xref(A, B) first finds the result set of N lists of prisma terms from the first N first documents of a web search of A. This calculation is query(A). This result is used to determine how many documents from this B as a prisma term. This number is Xref(A, B). This is one calculation of how frequently B is referenced by a search of A. Similarly, Xref (B,A) is calculated, which is how many times A is referenced by a search of B.

Next the results of Xref(A,B) are Xref(B,A) are compared to see if they are equal or approximately equal, 430. If Xref (A,B) and Xref(B,A) are equal or approximately equal, a node is formed representing the terms A and B and along with both of their attributes, 440. However, if Xref(A,B) is greater than Xref(B,A), step 450, then a two nodes, one for A and one for B are made with a node connection made going from A and ending at B, 460. However if Xref(B,A) is greater, than a node connection is made from B to A, 470. This process is repeated until a sufficient keyword graph is formed. As one in the art would realize, this graph may be stored on some storage device, for instance the graph may maintained as a database.

Figure 5:
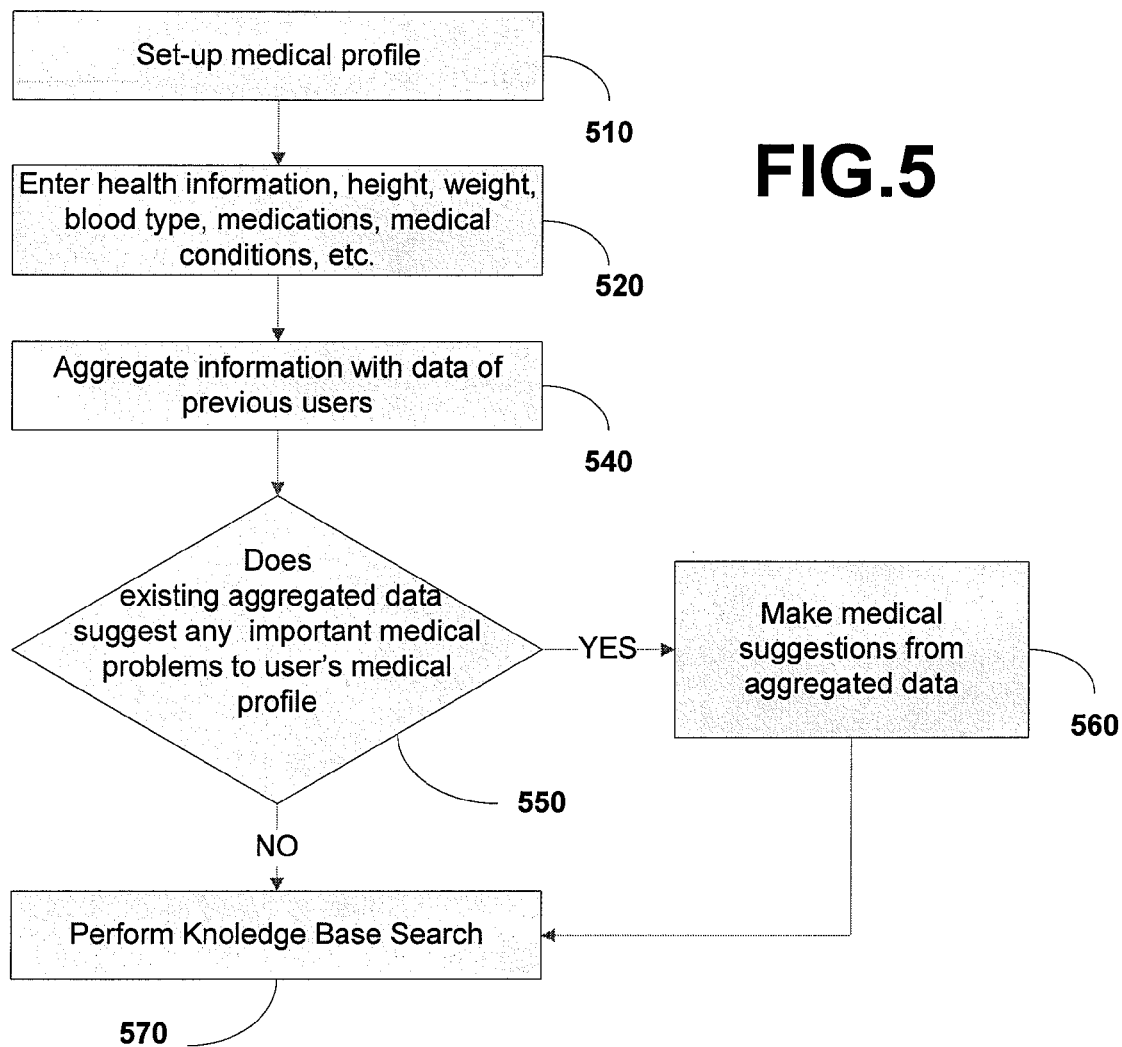
FIG. 5 is a flow diagram illustrating a method wherein a node graph is resolved into an acyclic graph according to one embodiment of the present invention.

FIG. 5 illustrates a flow diagram of an embodiment according to the present invention where a node graph is resolved into an acyclic graph. An acyclic graph is characterized by lack of cycles, or that the nodes do not lead back to itself. The first step is to assign all nodes an energy level of zero, 510. The next step is to traverse the graph and find all the source nodes and mark them, 520. As seen in FIG. 3, source nodes are characterized by having no predecessor, only successor nodes.

After all the source nodes have been found and marked, the graph is traversed for unmarked nodes, 530. For an unmarked node, its energy level is checked to see if it has at least one predecessors with same energy level, 540. If there are no predecessors with the same energy level as the unmarked node, then the node becomes marked, 550. If the opposite is true, then the energy level of the unmarked node is incremented, 560.

After either case, the next step is to check if there are still unmarked nodes left in the graph, 580. If so this process reiterates until the entire graph is marked. The final result is a directed acyclic graph. A simplified version is illustrated in FIG. 3.

FIGS. 1 through 5 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A computerized method for creating an acyclic directed keyword graph, the method comprising:
   electronically selecting a unique unused pair of terms from a keyword pool;
   calculating, by using a processor, a plurality of cross reference matrices for each of the terms in the selected pair of terms, the plurality of cross reference matrices including results from a web search of each term in the unique unused pair of terms;
   calculating, by using a processor, relevancy between the terms based on the plurality of cross reference matrices;
   electronically creating a node connection based on the relevancy between the terms; and
   repeating for another unique pair of terms until the acyclic directed keyword graph is of sufficient size.

2. The method of claim 1 wherein the keyword pool is a query log.

3. The method of claim 1 wherein the keyword pool is a dictionary.

4. Computer readable storage media comprising program code for execution by a programmable processor to perform a method for creating an acyclic directed keyword graph, the computer readable storage media comprising:
   program code for selecting a unique unused pair of terms from a keyword pool;
   program code for calculating, by using a processor, a plurality of cross reference matrices for each of the terms in the selected pair of terms, the plurality of cross reference matrices including results from a web search of each term in the unique unused pair of terms;
   program code for calculating relevancy between the terms based on the plurality of cross reference matrices;
   program code for creating a node connection based on the relevancy between the terms; and
   program code for repeating for another unique pair of terms until the acyclic directed keyword graph is of sufficient size.

5. The computer readable storage media of claim 4 wherein the keyword pool is a query log.

6. The computer readable storage media of claim 1 wherein the keyword pool is a dictionary.

* * * * *